(12) United States Patent
Kohl et al.

(10) Patent No.: US 6,555,930 B1
(45) Date of Patent: Apr. 29, 2003

(54) DEVICE FOR AUTOMATICALLY DETECTING A GENERATOR TYPE OF A MOTOR VEHICLE

(75) Inventors: Walter Kohl, Cleebronn (DE); Burkhard Hiller, Oberriexingen (DE); Klaus Ries-Mueller, Bad Rappenau (DE); Helmut Suelzle, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/857,743

(22) PCT Filed: Sep. 2, 2000

(86) PCT No.: PCT/DE00/03018

§ 371 (c)(1),
(2), (4) Date: Aug. 9, 2001

(87) PCT Pub. No.: WO01/28084

PCT Pub. Date: Apr. 19, 2001

(30) Foreign Application Priority Data

Oct. 12, 1999 (DE) .......................................... 199 49 031

(51) Int. Cl.[7] ................................................ H02P 9/04
(52) U.S. Cl. ...................................... 290/40 C; 322/37
(58) Field of Search ........................... 290/40 R, 40 A, 290/40 B, 40 C, 40 F; 322/14, 37, 28

(56) References Cited

U.S. PATENT DOCUMENTS

| | | | | |
|---|---|---|---|---|
| 3,947,757 A | | 3/1976 | Grube | ...................... 324/28 R |
| 4,851,757 A | * | 7/1989 | Zwicky et al. | ................. 322/58 |
| 5,336,932 A | * | 8/1994 | Barske | ........................ 290/1 R |
| 5,523,672 A | * | 6/1996 | Schramm et al. | ............. 322/25 |
| 5,525,913 A | | 6/1996 | Brooks | ........................ 324/771 |
| 5,546,317 A | | 8/1996 | Andrieu | ...................... 364/481 |
| 5,594,321 A | | 1/1997 | Kohl | ........................... 320/48 |
| 6,163,138 A | * | 12/2000 | Kohl et al. | .................... 322/28 |

FOREIGN PATENT DOCUMENTS

| | | |
|---|---|---|
| DE | 37 38 915 A | 5/1989 |
| EP | 0 376 983 B1 | 9/1992 |

* cited by examiner

Primary Examiner—Nicholas Ponomarenko
(74) Attorney, Agent, or Firm—Michael J. Striker

(57) ABSTRACT

According to the invention, an apparatus for automatically detecting a motor vehicle's generator type is proposed, in which the characteristic voltage course is measured at a terminal (DF) of the generator (1) and compared with values stored in memory. Via an interface (3), a control unit (5) is connected to the controller (2) or generator (1) and evaluates the voltage change ($\delta DF$) upon a load change. To that end, the voltage at the terminal (DF) is measured and evaluated before the electrical load (8) is turned on, after it is turned, and after it is turned off. By means of this apparatus, advantageously not only the generator type (A, B) but also incorrect installations can be ascertained.

9 Claims, 1 Drawing Sheet

DEVICE FOR AUTOMATICALLY DETECTING A GENERATOR TYPE OF A MOTOR VEHICLE

PRIOR ART

Figure 1:
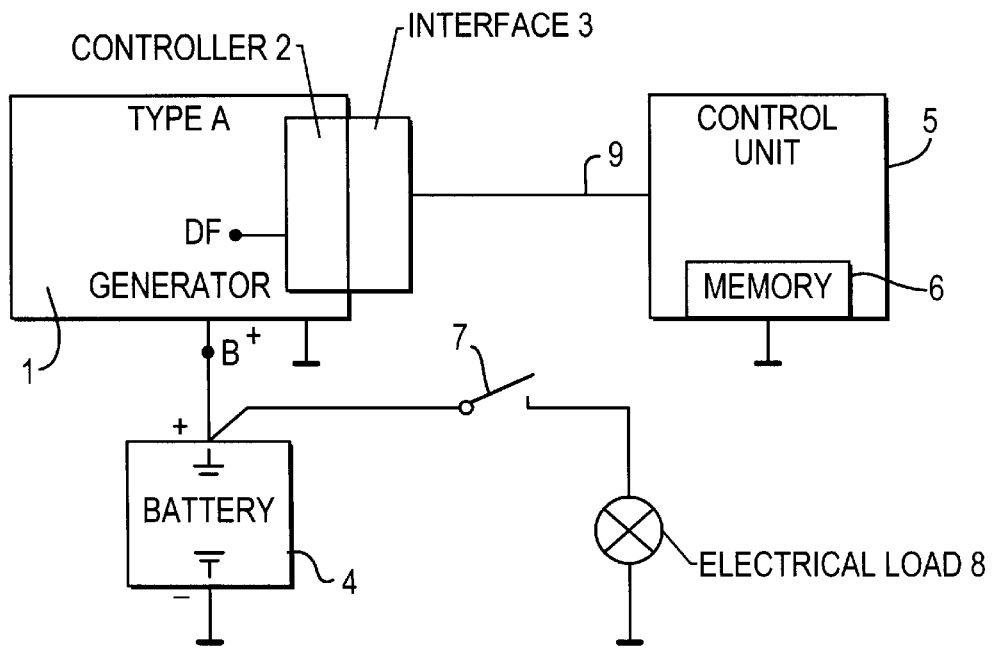

The invention is based on an apparatus for automatically detecting a motor vehicle's generator type, as generically defined by the preamble to the main claim.

Given the many types of motor vehicles, different generators with a different performance spectrum are required, which are controlled by suitable controllers. Thus in the event of repair of a controller, for instance, it can happen that the wrong generator type is installed, or that in the case of multi-generator operation, plugs are transposed, thus leading to corresponding problems, such as an overload on the controller or the generator connected to it. In this connection, a universal control unit for closed-loop control devices is known from European Patent Disclosure EP 0 376 983 B1 but this does not involve the detection of a special generator type for the motor vehicle but rather a universal control unit that can be adapted to the most various devices, such as engine control, ABS (Anti-lock Brake Systems) or ASR brake controllers (Traction Control). By polling the individual connections of a plug and by assigning different plugs differently, it is assured which unit is connected to the control device and which functions are necessary for controlling the connected unit. However, it appears unfavorable that with the units connected, the generator type cannot be ascertained by means of its behavior when a load is turned on.

ADVANTAGES OF THE INVENTION

The apparatus according to the invention having the characteristics of the body of the main claim has the advantage over the prior art that by simple provisions, namely the behavior of the generator when a load is turned on and off, the generator type can be detected. Complicated decoder circuits, type addressing operations, or mechanical encodings, for instance at the plug, are unnecessary. Nor is any additional hardware required, since the typical behavior of the generator can be detected by a simple program.

By the provisions recited in the dependent claims, advantageous refinements and improvements to the apparatus defined by the main claim are possible.

It is especially advantageous that the control unit performs the check of the generator type each time the internal combustion engine is started. This assures that a mistake that can happen at the repair facility, for instance, is detected early, so that damage to the generator, controller or other components cannot ensue.

It is considered particularly advantageous that an error signal is output, for instance visually or acoustically, to immediately tell the driver or a mechanic that an error has occurred.

The simplest method of type detection of the generator is considered to be that the set-point generator voltage is measured in its course as a function of time and stored in memory. Thus voltage changes can be most simply compared with the stored values.

Another good way of monitoring is to poll the signal at the terminal DF of the generator and compare it with the corresponding stored values. The current load of the generator can also be monitored at this terminal DF, so that in conjunction with the activated load and the voltage change, an unambiguous statement as to the generator type can be made.

It is also considered favorable that the voltage change is measured at the generator or at the terminal DF before and/or after the load is turned on. This is because when the load is turned on, the signal at the terminal DF increases relatively slowly, depending on the generator type and the load. When the load is turned off, conversely, the voltage rapidly fades, so that here the measurement is considered reliable after a predetermined waiting period has elapsed.

By measurements before the load is turned on, during the flow of electric current, and after the load is turned on, a reliable statement is advantageously obtained about the activated load as well.

To make it easy and fast to perform modifications, it is advantageous if as the memory, a nonvolatile memory is used that can be rewritten for new data, so that adaptations can be made quickly.

DRAWING

One exemplary embodiment of the invention is shown in the drawing and described in further detail below.

FIG. 1 shows a block circuit diagram; and

Figure 2A:
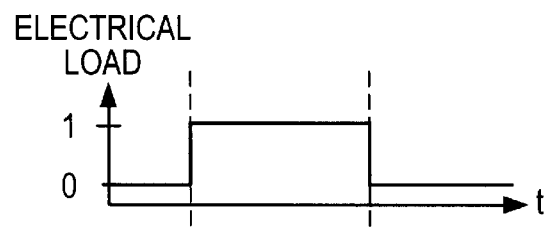

FIGS. 2a, b, c show three voltage graphs.

DESCRIPTION OF THE EXEMPLARY EMBODIMENT

The block circuit diagram of FIG. 1 shows a generator 1, which is for instance designated as type A. Typically, the generator 1 has an interface 3, which is solidly connected to the generator 1 and which, via suitable connections, controls the exciter current for the generator 1. At the output of the generator 1, at a terminal B+, the set-point voltage of the generator 1 can be picked up. At this terminal B+, a connection to the positive pole of a battery 4 is shown. The controller 2 is embodied with an interface 3, by way of which data for controlling the generator 1 can for instance be input, or data can also be read out by the generator, such as the voltage course at the terminal DF. These data are delivered over a line 9 to a control unit 5, which contains a suitable program for the evaluation. The control unit 5 also contains a memory 6, which is preferably embodied as a nonvolatile, rewritable memory. As a consumer, an electrical load 8 in the form of a light is shown, which can be actuated by a switch 7. Via the switch 7, the electrical load 8 is directly connected to the positive pole of the battery 4. For the sake of completeness, it should also be pointed out that the individual units are connected to the generator 1 or the battery 4 via the negative pole.

Figure 2B:
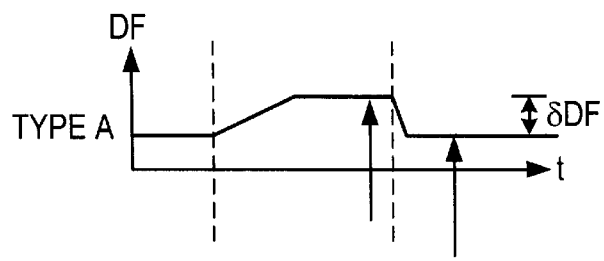
Figure 2C:
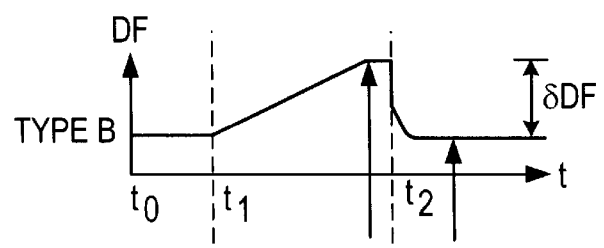

From FIGS. 2a–2c, the mode of operation of this arrangement will now be described in detail. As has already been indicated, for detecting the installed generator type, an electrical load 8 is activated, and before the activation, after it is turned on, and/or after it is turned off, the voltage course is measured, preferably at the terminal DF. In FIG. 2a, it is symbolically shown that the electrical load 8 is turned off in the period of time from $t_0$ to $t_1$. A low voltage is for instance measured at the terminal DF; the curve for the generator type A is shown in FIG. 2b and for the generator type B is shown in FIG. 2c.

If the most reliable possible statement about the generator type with its specific voltage characteristic curve is to be obtained, it is advantageous if the activated electrical load 8 is as large as possible, so that the control unit 5 can unambiguously detect voltage changes, designated by the symbol δDF. The engine should also be in a steady state, as in idling, so that rpm-dependent load changes at the generator can be kept as slight as possible. It is also advantageous not to activate any additional large loads during the measurement. However, this can be suppressed by performing a plurality of comparative measurements. It is also advantageous if the generator drive functions without error during the measurement and if the V-belt in particular causes no significant slip, so that the measurement finding is not adulterated.

To detect the generator type A or B, the voltage course is now measured by the control unit 5 at the terminal DF of the generator 1, via the line 9 and the interface 3. The measurement is preferably done at a certain operating point of the internal combustion engine, such as at constant rpm and at a constant electrical load. In the exemplary embodiment, a first measurement is now performed at time $t_0$ (FIGS. 2a–2c). At time $t_1$, the electrical load 8 is turned on; this can be detected as an electrical load 8 at the generator terminal DF by way of the voltage course, as shown in FIGS. 2b and 2c. After the transient response, which is apparent from the oblique edge of the voltage increase, the electrical load 8 is turned off in the steady state at time $t_2$. The voltage now drops by the amount δDF at the terminal DF (FIGS. 2b, 2c). This voltage change δDF is dependent on the generator type. In FIGS. 2b and 2c, it can be seen that the voltage change δDF of FIG. 2b for the generator type A is less than the voltage change δDF of FIG. 2c for the generator type B. The third measurement, like the second measurement, is done after a waiting time, so that the fading process will have ended. The measurement findings δDF obtained match the generator type and are stored in the memory 6 of the control unit 5 with reference to the activated electrical load 8. By comparison of these measured values with the stored data, the generator type is obtained in a simple way.

If there are major deviations from the data of stored generator types, then by means of further parameter values stored in memory and suitable recalculation, a conclusion can be drawn as to which generator is actually used. Transposition of plugs can also be discovered in this way, since the generators can be addressed by different addresses. Comparing the measurements before the electrical load is turned on and after it is turned off can improve the confidence level, since the voltage changes of the electrical load that is actually activated can be read out directly. Especially by repeated measurements and averaging, major deviations dictated by additional consumers can easily be eliminated.

What is claimed is:

1. An apparatus for automatically detecting a generator type of a motor vehicle having a generator (1) which is connected via an interface (3) to a control unit (5), and having a battery (4), characterized in that the control unit (5) has a memory (6) in which data of different generator types (A, B) are stored, and that the control unit (5) is embodied, by switching an electrical load (8) on and off, for detecting the voltage course at the generator (1) and, by comparison with the stored data, determining the generator type (A, B).

2. The apparatus of claim 1, characterized in that the control unit (5) is embodied for performing the comparison before and during starting of the internal combustion engine of the motor vehicle.

3. The apparatus of claim 1, characterized in that the control unit (5) outputs an error signal if the wrong generator type (A, B) is installed.

4. The apparatus of claim 1, characterized in that the control unit (5) has a memory (6) in which data on the voltage course at the generator (1) are stored as a function of the time (t).

5. The apparatus of claim 1, characterized in that the control unit (5) scans the voltage course at an internal terminal (DF) of the generator (1).

6. The apparatus of claim 5, characterized in that the control unit (5) detects the generator type (A, B) on the basis of the voltage change (δDF).

7. The apparatus of claim 5, characterized in that the control unit (5) detects the voltage change (δDF) when the electrical load (8) is shut off, after a waiting time (t) has elapsed.

8. The apparatus of claim 1, characterized in that the control unit (5) is embodied to evaluate the voltage increase after the electrical load (8) is turned on.

9. The apparatus of claim 1, characterized in that the memory (6) is a nonvolatile, rewritable memory.

* * * * *